(12) United States Patent
Sawada et al.

(10) Patent No.: US 7,003,301 B2
(45) Date of Patent: Feb. 21, 2006

(54) COMMUNICATION SYSTEM, COMMUNICATION METHOD AND MOBILE TERMINAL

(75) Inventors: Manabu Sawada, Yokohama (JP); Masahiro Kuwabara, Yokosuka (JP); Yutaka Aoki, Nisshin (JP); Minoru Okada, Nagoya (JP); Hiroshi Harada, Yokosuka (JP); Masayuki Fujise, Yokosuka (JP)

(73) Assignees: Denso Corporation, Kariya (JP); National Institute of Information and Communications Technology, Tokyo (JP)

( * ) Notice: Subject to any disclaimer, the term of this patent is extended or adjusted under 35 U.S.C. 154(b) by 862 days.

(21) Appl. No.: 09/953,429

(22) Filed: Sep. 17, 2001

(65) Prior Publication Data

US 2002/0034950 A1 Mar. 21, 2002

(30) Foreign Application Priority Data

Sep. 18, 2000 (JP) .............................. 2000-282255

(51) Int. Cl.
*H04Q 7/20* (2006.01)
*H04B 7/26* (2006.01)

(52) U.S. Cl. .................... 455/446; 455/33.1; 455/33.4; 455/34.1; 455/403; 455/436; 455/524; 455/561

(58) Field of Classification Search ............... 455/446, 455/507, 517, 557, 560, 422.1, 426.1, 33.1, 455/33.4, 34.1, 403, 436, 524, 561
See application file for complete search history.

(56) References Cited

U.S. PATENT DOCUMENTS

| | | | |
|---|---|---|---|
| 5,457,810 A | * | 10/1995 | Ivanov et al. ................ 455/441 |
| 5,513,380 A | * | 4/1996 | Ivanov et al. ................ 455/441 |
| 5,574,971 A | | 11/1996 | Aihara ........................ 455/441 |
| 5,715,516 A | * | 2/1998 | Howard et al. ........... 455/422.1 |
| 5,802,469 A | | 9/1998 | Nounin et al. ............ 455/422.1 |
| 5,805,576 A | * | 9/1998 | Worley et al. ............... 370/337 |
| 5,825,763 A | | 10/1998 | Kato et al. ................... 370/335 |
| 5,920,819 A | | 7/1999 | Asanuma ..................... 455/447 |
| 5,983,097 A | * | 11/1999 | Kakinuma et al. ........ 455/422.1 |

(Continued)

FOREIGN PATENT DOCUMENTS

DE 44 24 016 A1 1/1996

(Continued)

OTHER PUBLICATIONS

Anthony Acampora, "UniNet: A Hybrid Approach for Universal Broadband Access Using Small Radio Cells Interconnected by Free-Space Optical Links", *IEEE Journal on Selected Areas in Communications*, 0733-8716/98, vol. 16, No. 6, Aug., 1998, pp. 973-987.

(Continued)

*Primary Examiner*—Allan Hoosain
(74) *Attorney, Agent, or Firm*—Posz Law Group, PLC

(57) ABSTRACT

A Micro-cell is formed to include a plurality of spot-cells. Communication is executed between a micro-cell base station and a mobile terminal in the micro-cell, and between a spot-cell base station and the mobile terminal in the spot cell. The micro-cell base station and spot-cell base stations are connected to an integrated base station. A signal transmitted to the micro-cell base station from the mobile terminal is transferred to the integrated base station and information transmitted to the mobile terminal is transferred to the micro-cell base station and/or spot-cell base station from the integrated base station. The respective integrated base stations are connected to a server via a dedicated backbone to enable a large-capacity transmission.

25 Claims, 16 Drawing Sheets

U.S. PATENT DOCUMENTS

| | | | |
|---|---|---|---|
| 6,006,093 A | 12/1999 | Aalto et al. | 455/443 |
| 6,049,721 A | 4/2000 | Serizawa et al. | 455/509 |
| 6,144,861 A * | 11/2000 | Sundelin et al. | 455/522 |
| 6,278,883 B1 | 8/2001 | Choi | 455/552.1 |
| 6,339,705 B1 * | 1/2002 | Pehrson | 455/419 |
| 6,473,624 B1 * | 10/2002 | Corbett et al. | 455/522 |
| 6,681,123 B1 * | 1/2004 | Leppa et al. | 455/561 |
| 6,731,938 B1 * | 5/2004 | Seo et al. | 455/446 |
| 6,766,172 B1 | 7/2004 | Tokuda et al. | 455/445 |

FOREIGN PATENT DOCUMENTS

| | | |
|---|---|---|
| EP | 0884921 A1 | 12/1998 |
| JP | A-2000-196619 | 7/2000 |

OTHER PUBLICATIONS

David J. Goodman et al., "INFOSTATIONS: A New System Model for Data and Messaging Services", *IEEE*, 0-7803-369-3/97, Mar., 1997, pp. 969-973.

* cited by examiner

COMMUNICATION SYSTEM, COMMUNICATION METHOD AND MOBILE TERMINAL

CROSS REFERENCE TO RELATED APPLICATION

This application is based on and incorporates herein by reference Japanese Patent Application No. 2000-282255 filed on Sep. 18, 2000.

BACKGROUND OF THE INVENTION

The present invention relates to a communication system, a communication method and a mobile terminal used for communications between base stations and mobile terminals.

A micro-cell system represented by PDC is provided as a communication system for executing communication between base stations and mobile terminals. In this micro-cell system, large-capacity transmission, which occupies a broad frequency band for the effective use of frequency, is difficult. Moreover, a spot-cell system enabling large-capacity transmission is also provided but this system has a restricted service area.

SUMMARY OF THE INVENTION

The present invention has an object to provide a communication system, a communication method and a mobile terminal which enable large-capacity transmission with less restriction on the service area.

According to the present invention, a micro-cell is formed to include a plurality of spot-cells. Communication is executed between a micro-cell base station and a mobile terminal in the micro-cell, and between a spot-cell base station and the mobile terminal in the spot cell. The micro-cell base station and spot-cell base stations are connected to an integrated base station. A signal transmitted to the micro-cell base station from the mobile terminal is transferred to the integrated base station and information transmitted to the mobile terminal is transferred to the micro-cell base station and/or spot-cell base station from the integrated base station. The respective integrated base stations are connected to a server via a dedicated backbone to enable a large-capacity transmission.

BRIEF DESCRIPTION OF THE DRAWINGS

The above and other objects, features and advantages of the present invention will become more apparent from the following detailed description made with reference to the accompanying drawings. In the drawings.

Figure 1:
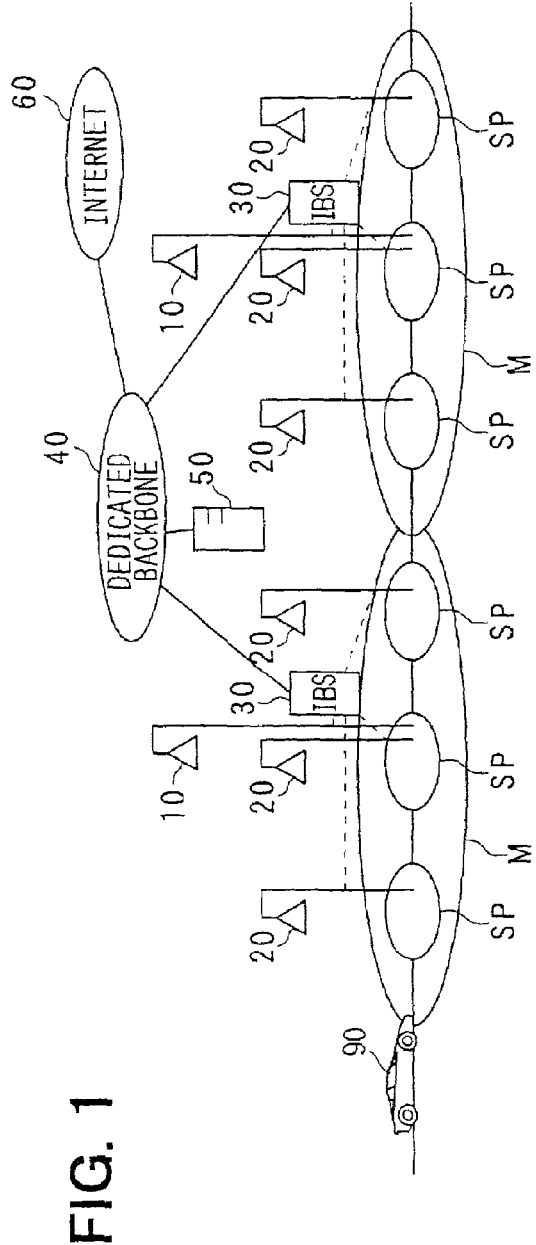
FIG. 1 illustrates a road-to-vehicle communication system according to a first embodiment of the present invention.

DETAILED DESCRIPTION OF THE PREFERRED EMBODIMENT (First Embodiment)

In a road-to-vehicle communication system, a zone for road-to-vehicle communication is divided into a plurality of large cells. Each large cell is composed of a wide range micro-cell M (wide cell) of a cellular system used for mobile telephones and PHS and a narrow range spot-cell (narrow cell) used for DSRC (dedicated short-range communication). This micro-cell M includes a plurality of (three or more) spot cells SP. In the micro-cell M, communication is possible in various areas because the communication area is wide. However, since many mobile terminals such as phones in vehicles sometimes exist in the cell and communication is executed with the mobile terminals in more distant areas, large-capacity communication is impossible. For instance, where the communication is executed at 100 Mbps or higher within 1 km radius of the cell, it is impossible to realize sufficient communication with all mobile terminals. Meanwhile, in the spot-cell SP, a small number of mobile terminals exist within the spot-cell SP of the narrow range. Therefore this spot-cell SP is suitable for large-capacity communication. However, since the communication area is narrow, the communication time for the mobile terminals is rather short. Therefore, in this embodiment, communication with mobile terminals is performed with integration of the communication within the micro-cell M and the communication within a plurality of spot-cells SP is included in the micro-cell M.

In case that data is transmitted through division of the micro-cell M and spot-cell SP or small capacity data and large capacity data such as audio data and video data are transmitted, the small capacity data (e.g., audio data) can be transmitted in the micro-cell M, and the large capacity data (e.g., video data) can be transmitted in the spot-cell SP. Moreover, when a plurality of data packets are transmitted, transmission may be realized by dividing the number of packets for the micro-cell M and spot-cell SP. Thus co-existence of the micro-cell M and a plurality of spot-cells SP can eliminate communication halt areas and can also improve the entire throughput with the effect of large-capacity transmission in a plurality of spot-cells SP.

In such road-to-vehicle communication, communication is executed between a micro-cell base station (wide cell base station) 10 and a mobile terminal 90 mounted in a vehicle in the micro-cell M, while communication is executed between a spot-cell base station (narrow cell base station) 20 and the mobile terminal 90 in the spot-cell SP. In this case, the spot-cell SP is formed just under the antenna of the spot-cell base station 20. Since the spot-cell SP is included in the micro-cell M, the micro-cell base station 10 can make communication with the mobile terminal 90 even in the spot-cell SP.

The micro-cell base station 10 and the spot-cell base station 20 are connected to an integrated base station 30. The signal transmitted to the micro-cell base station 10 from the mobile terminal 90 is transferred to the integrated base station 30 and the information transmitted to the mobile terminal 90 is also transferred to the micro-cell base station 10 and/or spot-cell base station 20 from the integrated base station 30.

The integrated base station 30 in the respective large cells is connected to a dedicated backbone 40, which is an exclusive communication network. This dedicated backbone 40 is connected with a server 50 and with an external network (e.g., Internet) 60. This server 50 has a function to control the road-to-vehicle communication and also a function to store contents information for the requests from the mobile terminals. This server 50 may be formed of one unit and/or of a plurality of units.

Control information from the mobile terminal 90 (including information pieces for ID request, information request and ACK or the like explained later) is transferred to the server 50 from the micro-cell base station 10 via the integrated base station 30 and through the dedicated backbone 40. The information transferred to the mobile terminal 90 (including the information obtained from the Internet or the like) is transferred to the object mobile terminal 90 from the server 50 via the dedicated backbone 40 and from the integrated base station 30 via the micro-cell base station 10 and/or spot-cell base station 20.

Figure 2:
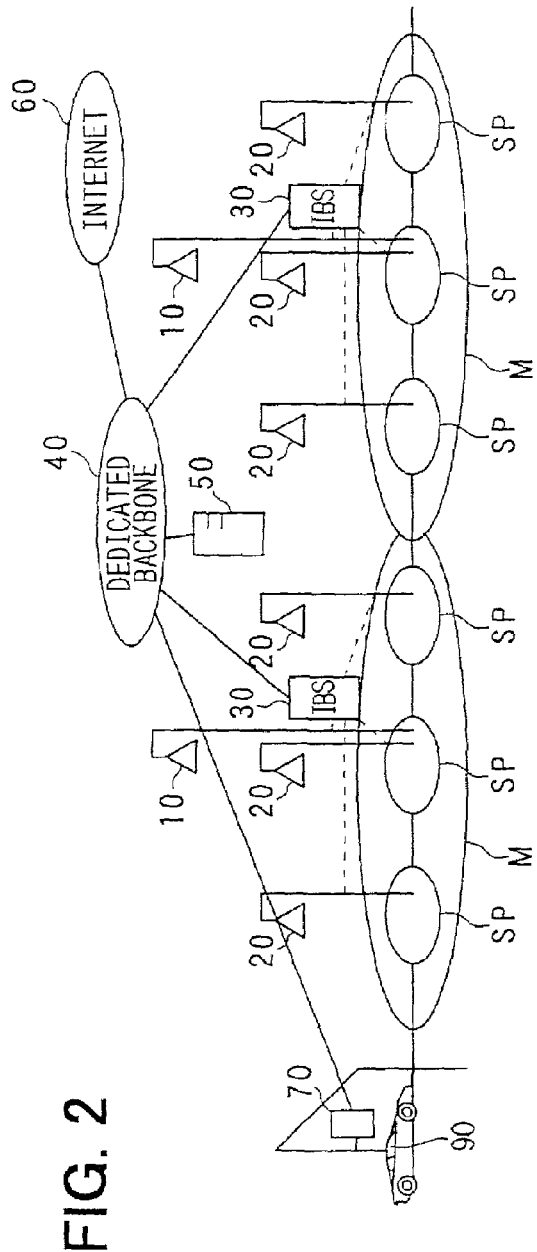
FIG. 2 illustrates one operation of the communication system, in which a server is notified that a mobile terminal has entered a road-to-vehicle communication zone.
Figure 3:
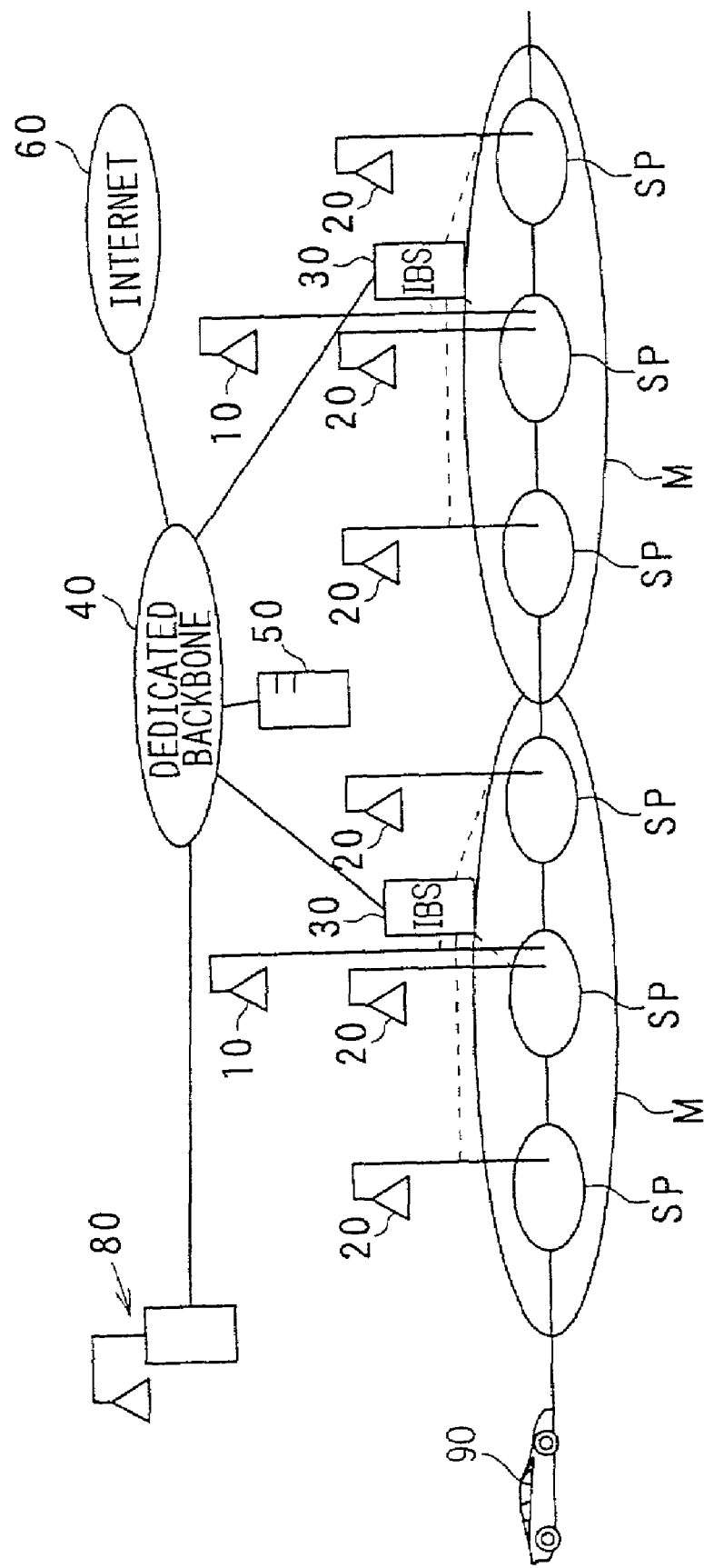
FIG. 3 illustrates another operation of the communication system, in which the server is notified that the mobile terminal has entered the road-to-vehicle communication zone.

In FIG. 2, a zone leading communication unit 70 is provided at the entrance of the road-to-vehicle communication zone. The zone leading communication unit 70 executes the communication with the mobile terminal 90 to detect which mobile terminal has entered the road-to-vehicle communication zone and notifies it to the server 50 via the dedicated backbone 40. In FIG. 3, the mobile terminal 90 detects the current position thereof from a position detecting unit such as GPS or the like and notifies the current position or the like thereof to a base station 80 of a mobile telephone using a radio communication device such as a mobile telephone. The server 50 receives the current position of the mobile terminal 90 from the base station 80 for mobile telephones via the dedicated backbone 40 to determine which mobile terminal has entered the road-to-vehicle communication zone. Thereby, the server 50 can detect which mobile terminal has entered the road-to-vehicle communication zone and realize normalized communication with such a mobile terminal within the road-to-vehicle communication zone.

Figure 4:
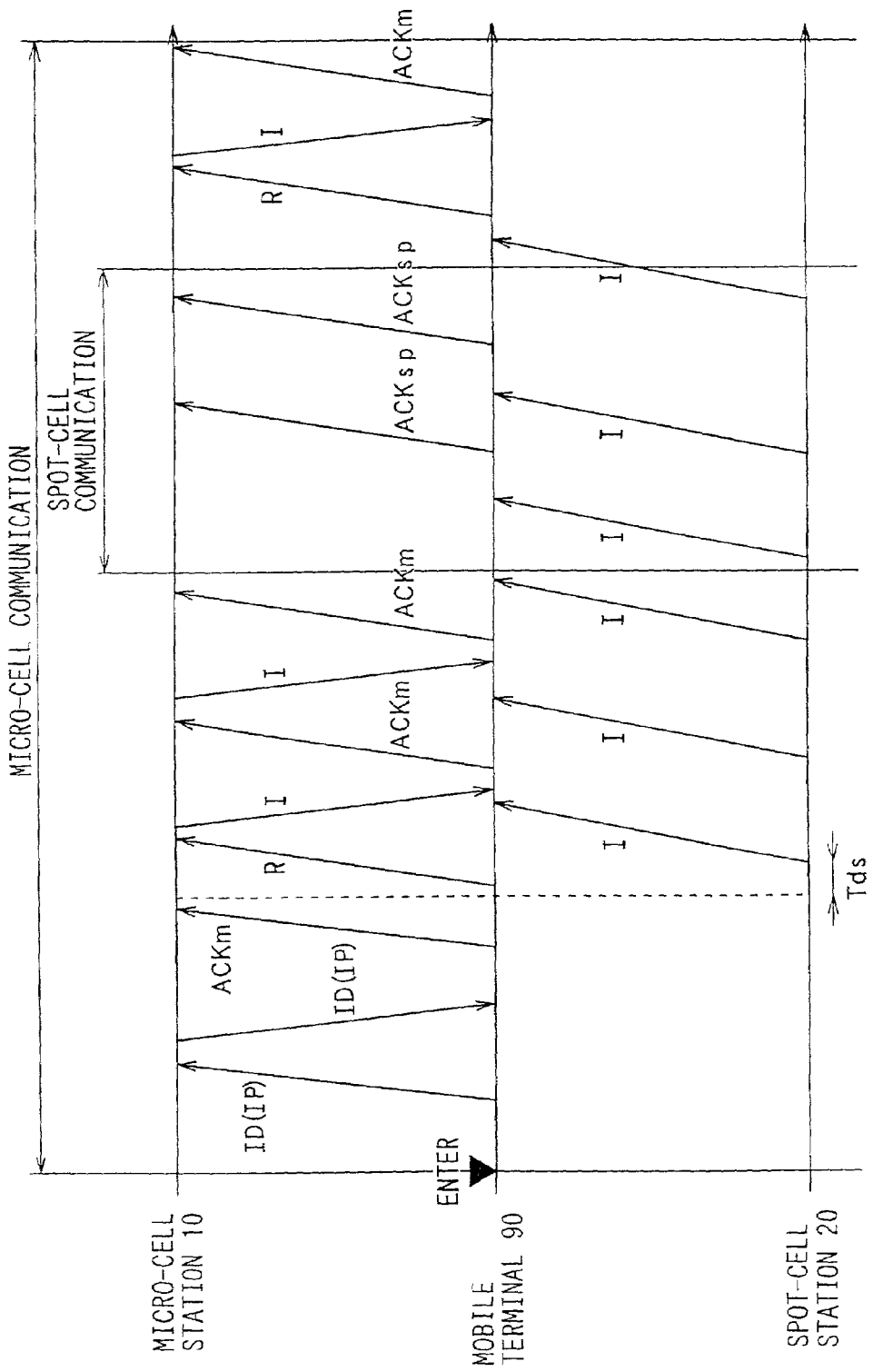
FIG. 4 illustrates one operation of communication between the mobile terminal and a micro-cell base station and/or a spot-cell base station in the communication system.

Communication is executed as illustrated in FIG. 4 between the mobile terminal 90 and the micro-cell base station 10 and/or spot-cell base station 20. In this embodiment, the up-link for transmission from the mobile terminal 90 to the base station and the down-link for transmission from the base station to the mobile terminal 90 are used in the micro-cell M, while only the down-link is used in the spot-cell SP. Here, the up-link information transmitted to the micro-cell base station 10 is transferred to the server 50 from the integrated base station 30 via the dedicated backbone 40 and the information transmitted to the mobile terminal 90 from the server 50 is transmitted to the mobile terminal 90 from the micro-cell base station 10 and/or spot-cell base station 20 via the integrated base station 30. Only the communication between the mobile terminal 90 and the micro-cell base station 10 and/or spot-cell base station 20 will be explained hereunder by eliminating the flow of signals in the integrated base station 30, dedicated backbone 40 and server 50.

First, when the mobile terminal 90 detects that it has entered the micro-cell M (e.g., with a field intensity of radio wave), the mobile terminal 90 transmits a request of an identification (ID) or internet protocol (IP) to the micro-cell base station 10. Meanwhile, the micro-cell base station 10 transmits the ID or IP to the mobile terminal 90 in response to such a request. The mobile terminal 90 transmits an acknowledgment (ACKm) to the micro-cell base station 10. Thereafter, when an information request (R) is transmitted to the micro-cell base station 10 from the mobile terminal 90, the micro-cell base station 10 transmits information (I) requested and the mobile terminal 90 transmits the ACKm to the micro-cell base station 10. Moreover, when there is information to be transmitted to the mobile terminal 90, the micro-cell base station 10 transmits the information to the mobile terminal 90 and the mobile terminal 90 transmits the ACKm to the micro-cell base station 10 in response to such a transmission of information. As explained above, communication is executed between the mobile terminal 90 and the micro-cell base station 10.

In the communication illustrated in FIG. 4, it is unknown when the mobile terminal 90 enters the spot-cell SP. Therefore, the micro-cell base station 10 receives the ACKm for giving ID or IP and the spot-cell base station 20 repeatedly transmits the information to the spot-cell SP after the predetermined time (Tds) has passed after establishment of communication between the micro-cell base station 10 and the mobile terminal 90. When the mobile terminal 90 enters the spot-cell SP and receives the information transmitted from the spot-cell base station 20, it returns another acknowledgment (ACKsp) for this information to the micro-cell base station 10. Thereby, the server 50 can detect that the mobile terminal 90 has entered the spot-cell SP.

When the mobile terminal 90 has passed the spot-cell SP, the ACKsp for transmission of such information from the spot-cell base station 20 is not transmitted to the micro-cell base station 10. The server 50 determines that the mobile terminal 90 has passed the spot-cell SP and thereafter it instructs the spot-cell base station 20 to stop the transmission of the information to such mobile terminal 90. It is also possible to continuously transmit the information to the mobile terminal 90 even after the mobile terminal 90 has passed the spot-cell SP.

Figure 5:
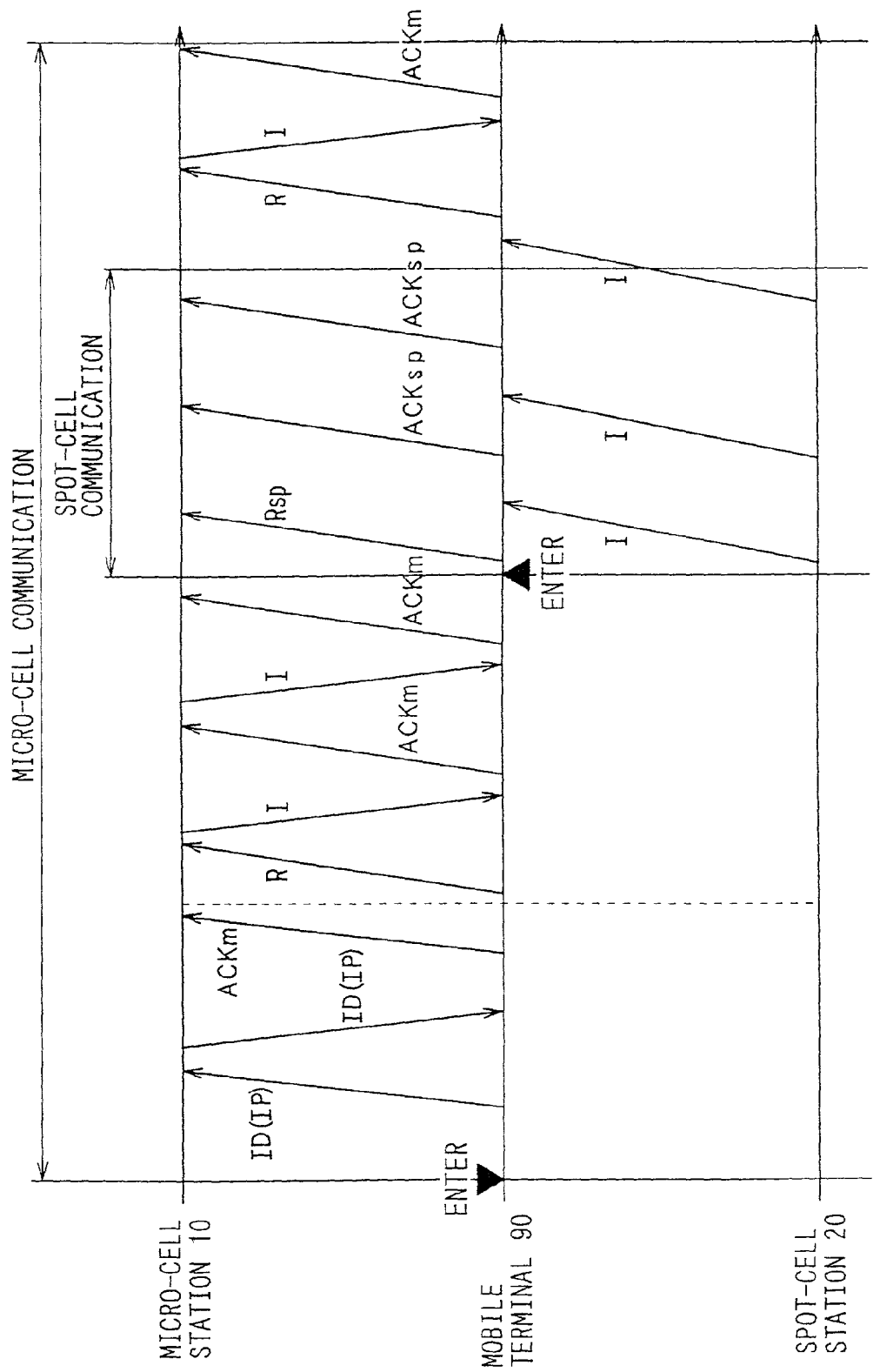
FIG. 5 illustrates another operation of communication between the mobile terminal and the micro-cell base station and/or the spot-cell base station.

The communication may alternatively be executed as illustrated in FIG. 5. When the mobile terminal 90 detects that it has entered the spot-cell SP (e.g., with a field intensity of radio wave), the mobile terminal 90 transmits an information request Rsp in the spot to the micro-cell base station 10. With this information request Rsp, the server 50 detects that the mobile terminal 90 has entered the spot-cell SP and thereafter instructs the spot-cell base station 20 to transmit the information to the mobile terminal 90. Other operations are similar to that of FIG. 4.

Figure 6:
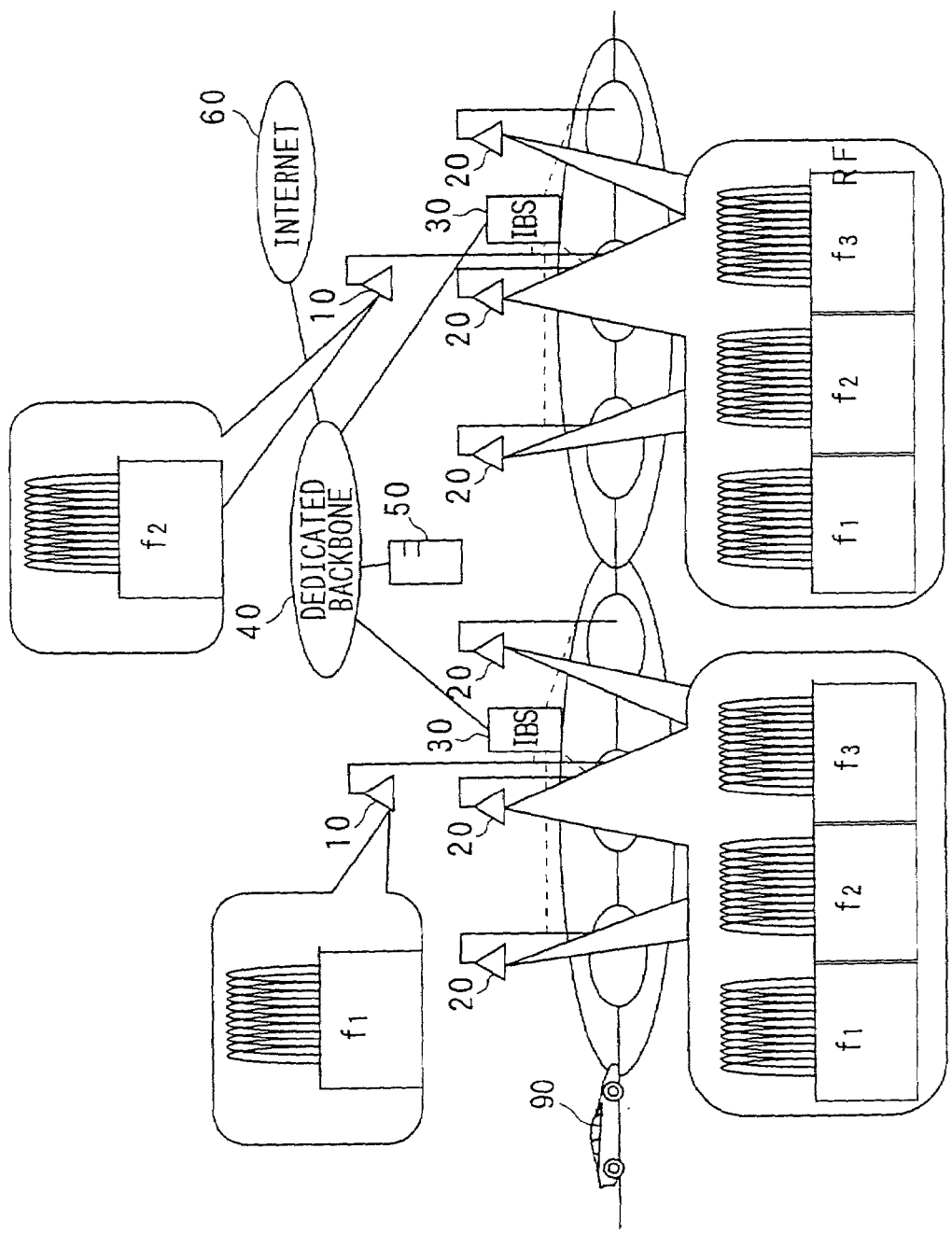
FIG. 6 illustrates a communication system used between the mobile terminal and the micro-cell base station and/or the spot-cell base station.

Next, the communication system between the mobile terminal 90 and micro-cell base station 10 and/or spot-cell base station 20 will be explained. In FIG. 6, the communication based on OFDM (orthogonal frequency division multiplexing) system is illustrated. In this system, transmission is executed at the RF frequency of the micro-cell base station 10 which is the same as hat of only one station among a plurality of spot-cell base stations 20. In the figure, the RF frequency f1 of the micro-cell base station 10 is set to be identical to only one among the RF frequencies f1, f2, f3 of three spot-cell base stations 2 in the left side large cell, while the RF frequency f2 of the micro-cell base station 10 is set to be identical to one RF frequency among the frequencies f1, f2, f3 of three spot-cell base stations 20 in the right side large cell. When the identical signals are transmitted, both signals are synchronously transmitted or these are transmitted with the predetermined delay. Moreover, it is also possible, in addition to transmission of the identical signals, to transmit the different signals in the micro-cell M and spot-cell SP.

Figure 7:
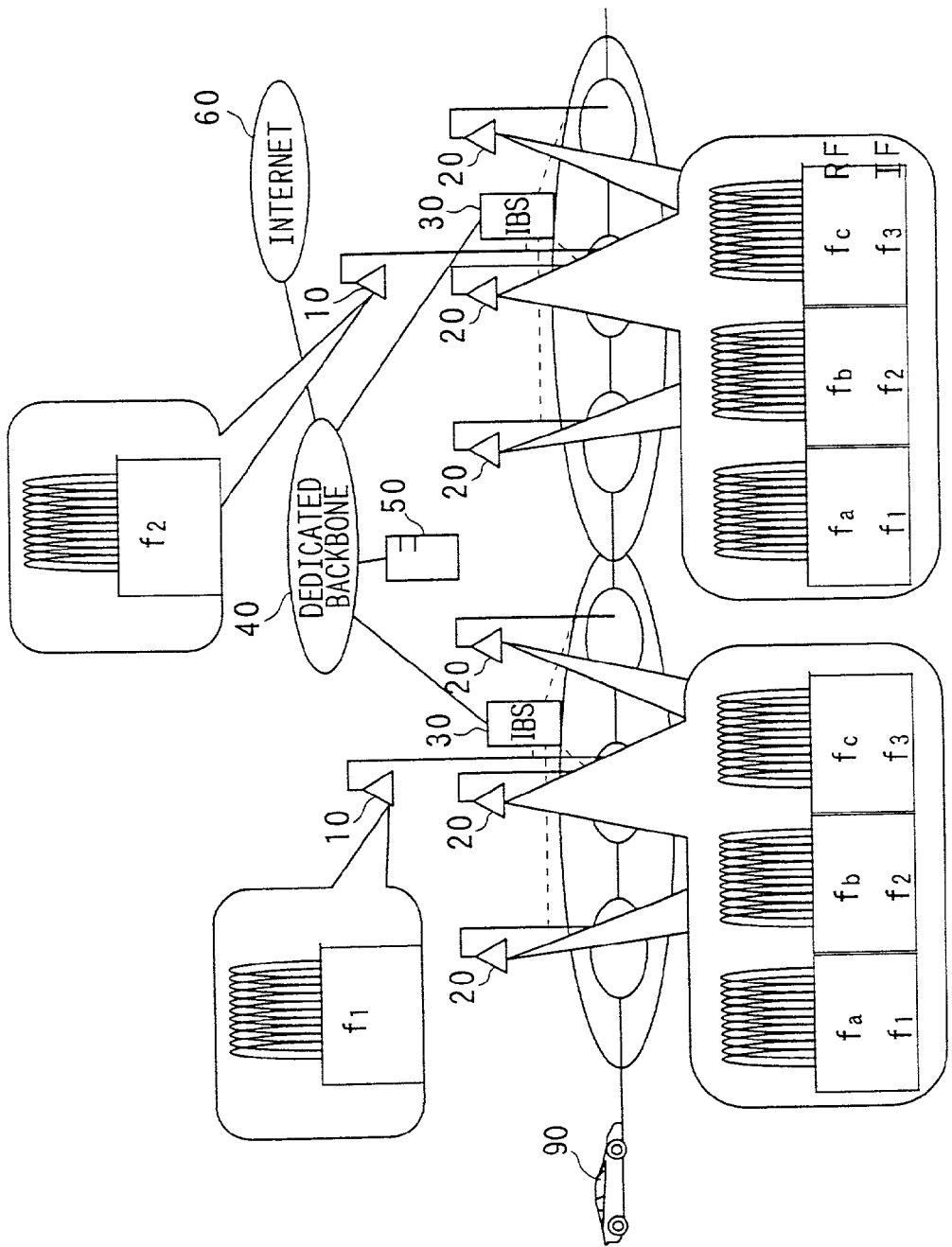
FIG. 7 illustrates a modification of the communication system illustrated in FIG. 6.

As illustrated in FIG. 7, the RF frequency f1, f2 of the micro-cell base station 10 may be different from any of the RF frequencies fa, fb, fc of three spot-cell base stations 2. In this instance, however, the RF frequency f1 of the micro-cell base station 10 is set to be identical to any one of the IF frequencies f1, f2, f3 (RF frequencies are fa, fb, fc) of the three spot-cell base stations 20 in the left side large cell, while the RF frequency f2 of the micro-cell base station 10 is set to be identical to any one of the IF frequencies f1, f2, f3 (RF frequencies are fa, fb, fc) of the three spot-cell base stations 20 in the right side large cell. Moreover, all frequencies used by the spot-cell base stations may be identical.

Figure 8:
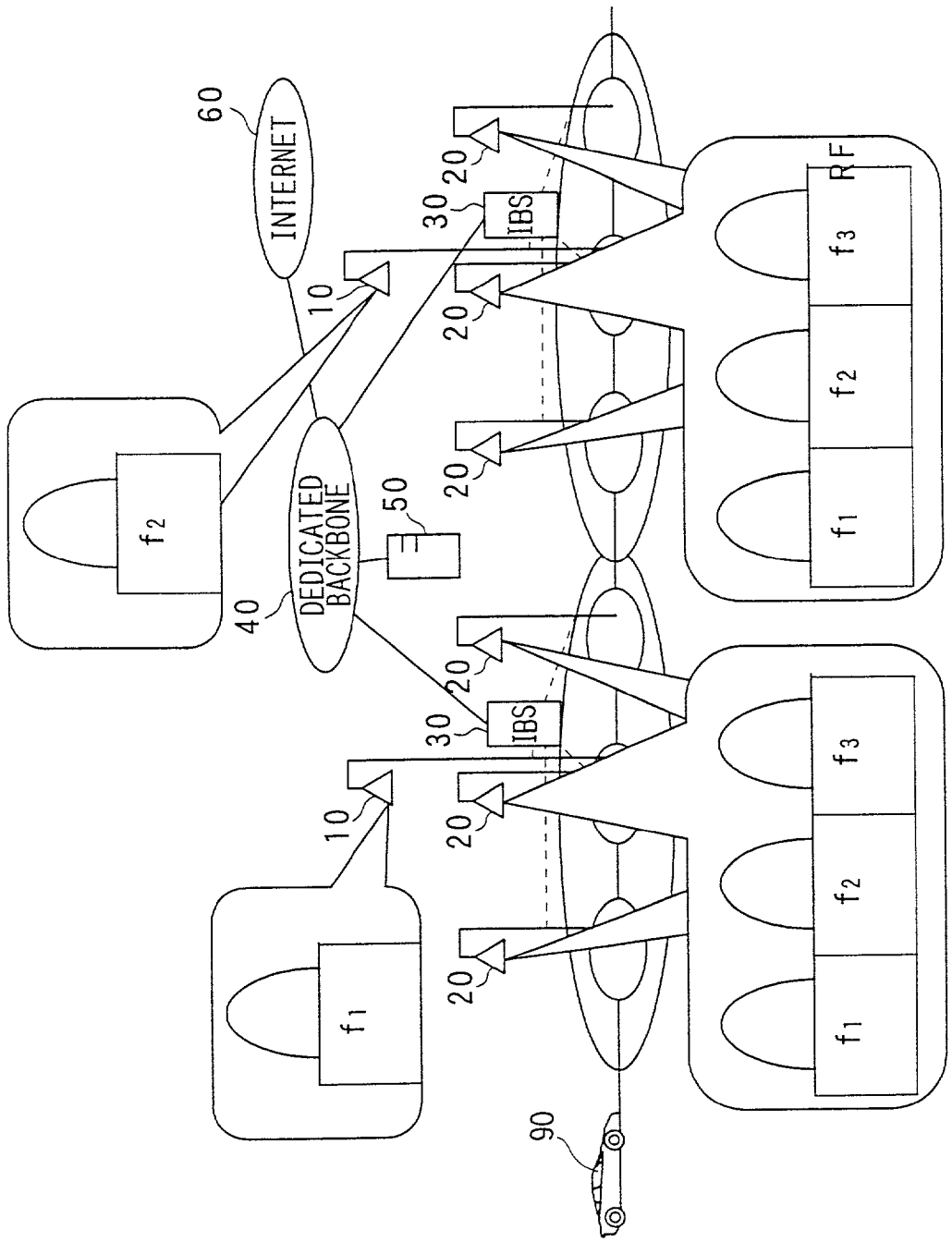
FIG. 8 illustrates another communication system used between the mobile terminal and the micro-cell base station and/or the spot-cell base station.
Figure 9:
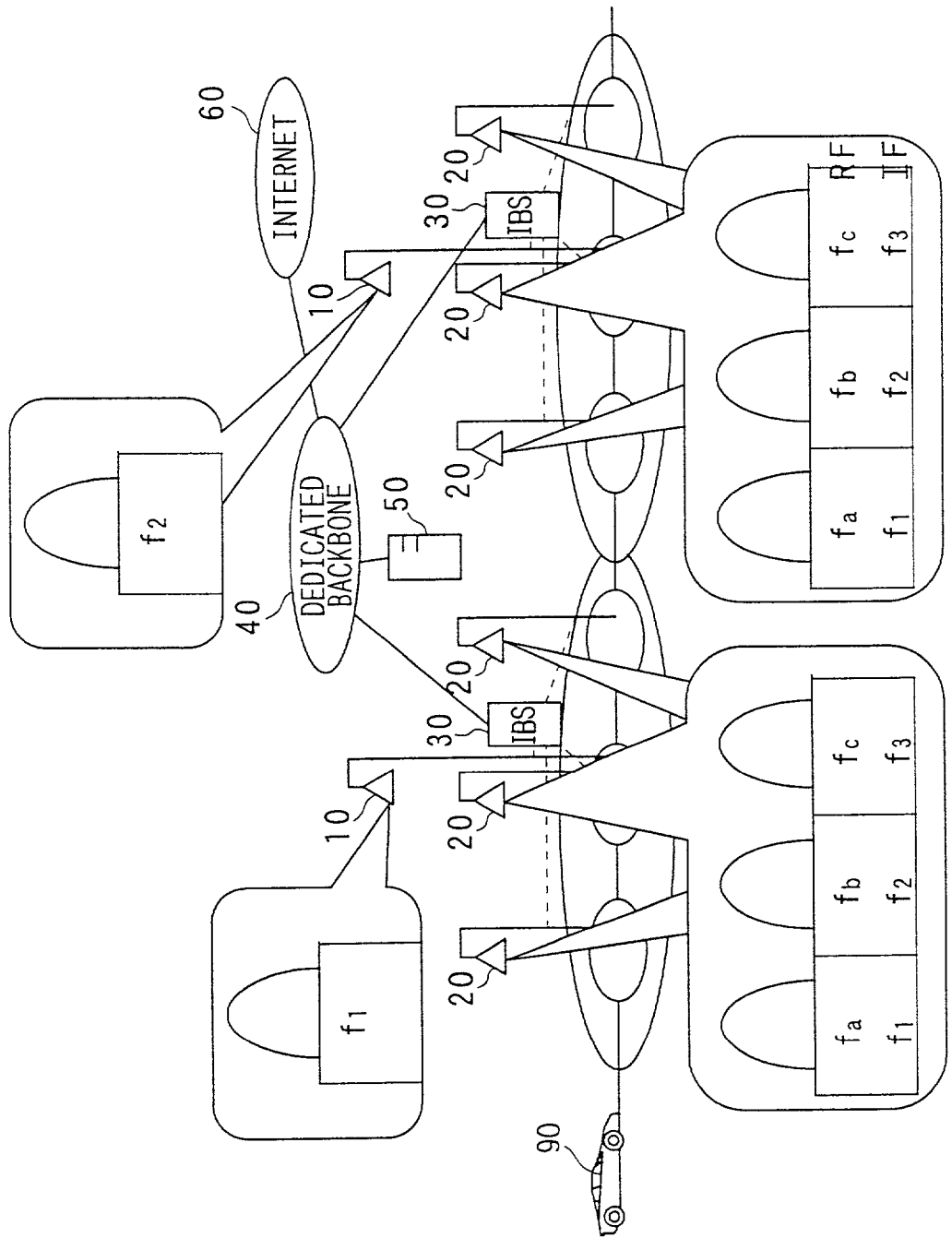
FIG. 9 illustrates a modification of the communication system illustrated in FIG. 8.

In addition, the communication using a single carrier signal such as SS (spread spectrum) may be substituted for communication using the OFDM signal as illustrated in FIG. 8. In this instance, the RF frequency which is identical to that of the micro-cell base station 10 may be used for transmission in any one among a plurality of spot-cell base stations 20 in FIG. 6. Moreover, as illustrated in FIG. 9, the RF frequency of the micro-cell base station 10 can be set to be identical to any one of the IF frequencies of three spot-cell base stations 20 as in FIG. 7.

As illustrated in FIG. 6 to FIG. 9, the RF frequency of the micro-cell base station 10 is set to be identical to the RF frequency (or IF frequency) of one spot-cell base station 20. As a result, same communication apparatus can be used. That is, same structure may be introduced for the RF/IF circuit or the like to be installed in the micro-cell base station 10, spot-cell base station 20 and mobile terminal 90 unlike the case where different frequencies are used.

Figure 10:
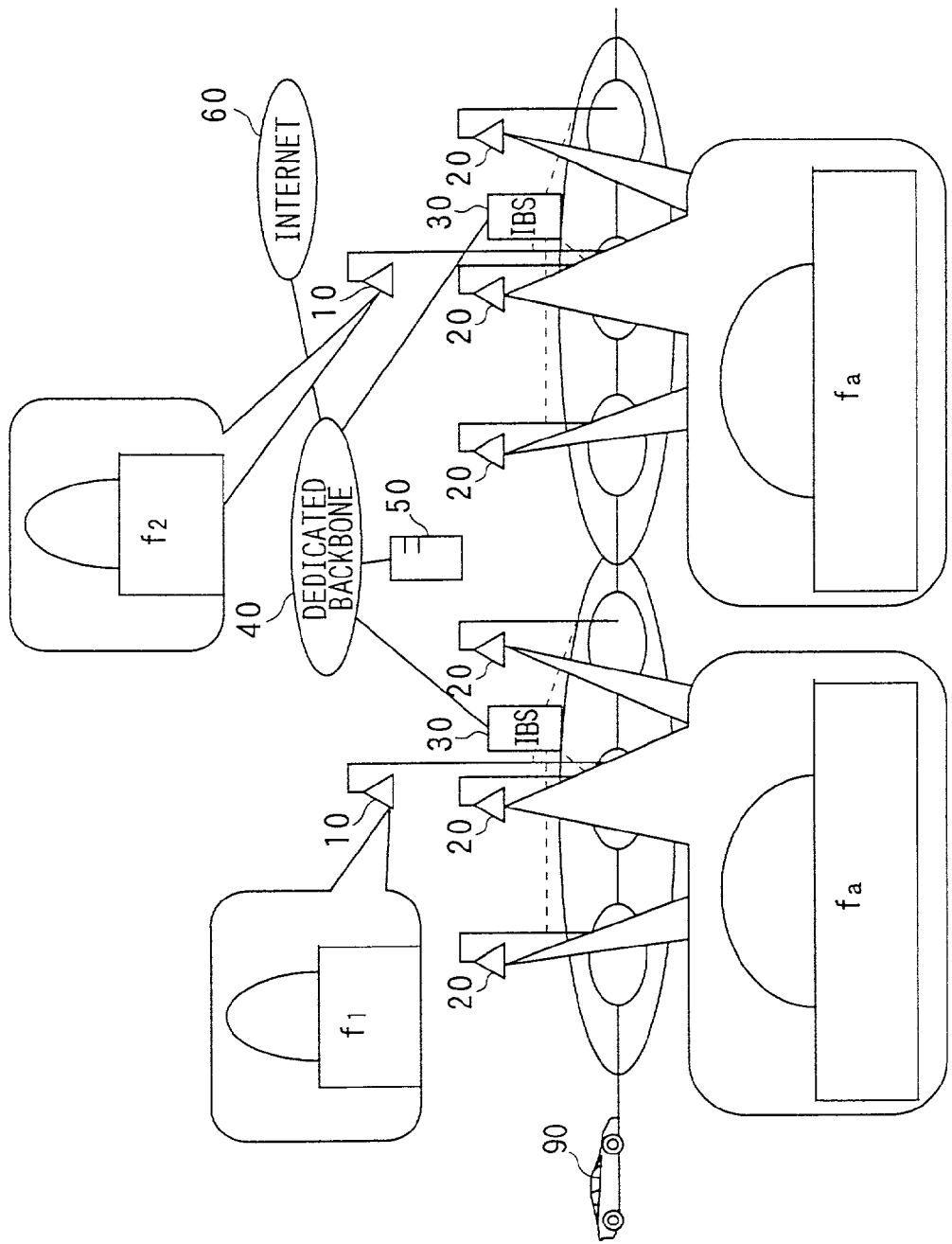
FIG. 10 illustrates a further communication system used between the mobile terminal and the micro-cell base station and/or the spot-cell base station.

Moreover, two different communication systems may be adopted as illustrated in FIG. 10. In this case, different frequency bands must be used in the micro-cell M and spot-cell SP. In FIG. 6 to FIG. 10, the same signal or different signals may be transmitted from the three spot-cell base stations 20 to the respective spot-cells SP.

Figure 11:
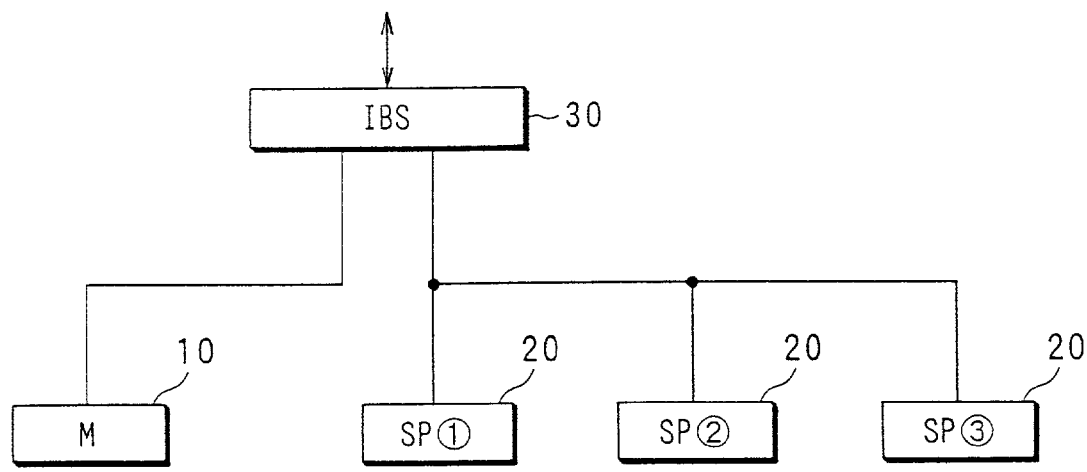
FIG. 11 illustrates a data route from an integrated base station.
Figure 12:
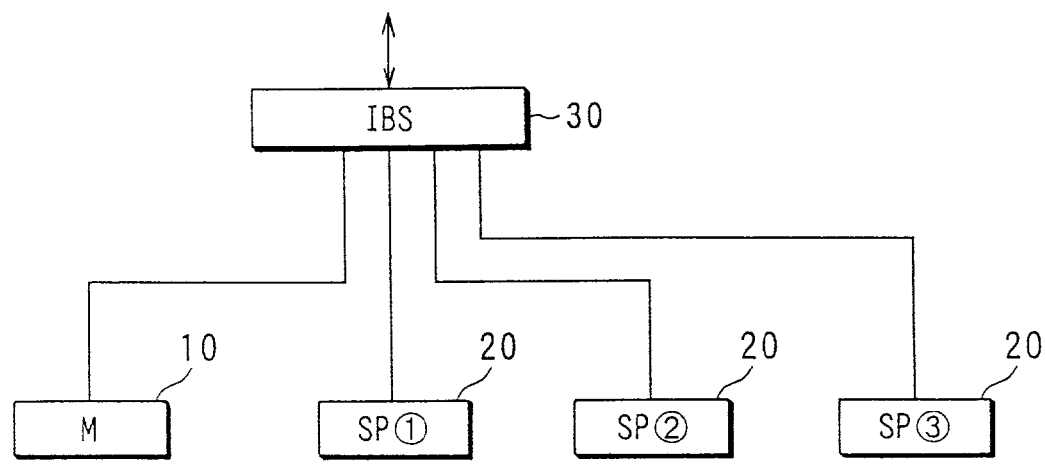
FIG. 12 illustrates another route from the integrated base station.

FIG. 11 and FIG. 12 illustrate data route from the integrated base station 30. The integrated base station 30 receives data from the dedicated backbone 40 and transmits the transmitting information respectively to the micro-cell base station 10 and spot-cell base station 20. In FIG. 11, the same signal is transmitted from the spot-cell SP. In FIG. 12, different signals are respectively transmitted from the spot-cell base station 20.

Figure 13:
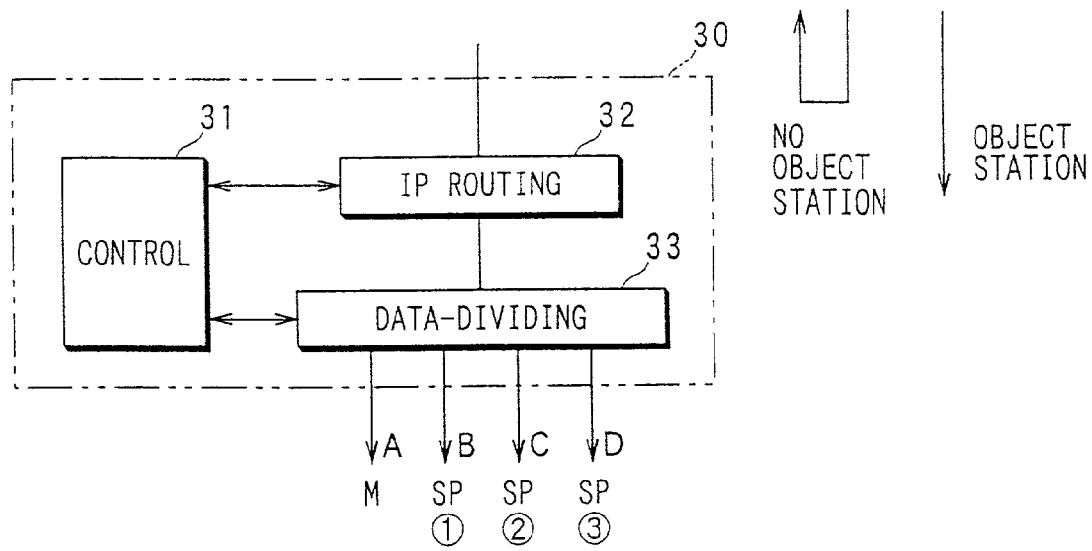
FIG. 13 illustrates the integrated base station illustrated in FIGS. 12 and 13.

FIG. 13 illustrates an example of the integrated base station 30. The integrated base station 30 comprises a control unit 31, an IP routing unit 32 and a data-dividing unit 33. The control unit 31 controls the IP routing unit 32 and data-dividing unit 33. The IP routing unit 32 transmits the data transmitted from the dedicated backbone 40 to the data-dividing unit 33 only when the object mobile terminal 90 exits within the object large cell. The data-dividing unit 33 respectively transmits the data to the micro-cell base station 10 and three spot-cell base stations 20. Here, the data transmitted to the micro-cell base station 10 is defined as A, while the data transmitted to the three spot-cell base stations 20 are defined as B, C, D, respectively.

The data-dividing unit 33 divides the data as illustrated in FIGS. 14A, 14B, 14C, 14D. In the dividing method of FIG. 14A, W1% of one data is transmitted to the micro-cell base station 10 as the data A, while X1% of one data is transmitted to the spot-cell base stations 20 as the data B, C, D of the same data. As illustrated in FIG. 11, the integrated base station 30 is structured to transmit the same data to three spot-cell base stations 20.

Figure 14A:
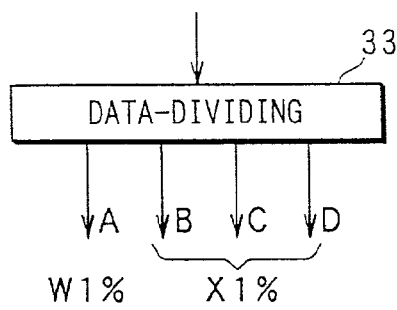
FIGS. 14A, 14B, 14C and 14D illustrate data dividing operations of a data-dividing unit.
Figure 14B:
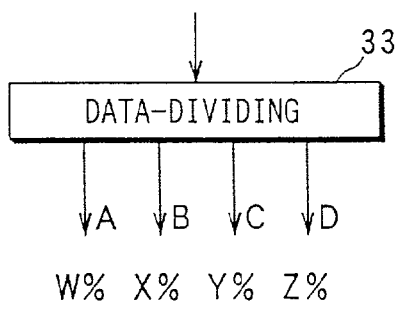

In the dividing method of FIG. 14B, W % of one data is transmitted as the data A to the micro-cell base station 10, while X % is transmitted to the spot-cell base station 20 as the data B, Y % to the spot-cell base station 20 as the data C and the Z % to the spot-cell base station 20 as the data D. In this method, as illustrated in FIG. 12, different signals are respectively transmitted to three spot-cell base stations 20 from the integrated base station 30.

Figure 14C:
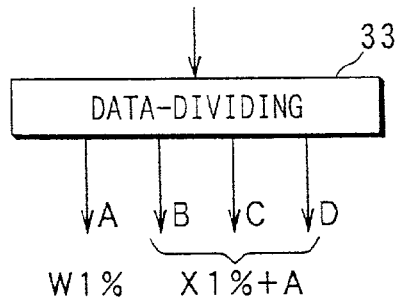
Figure 14D:
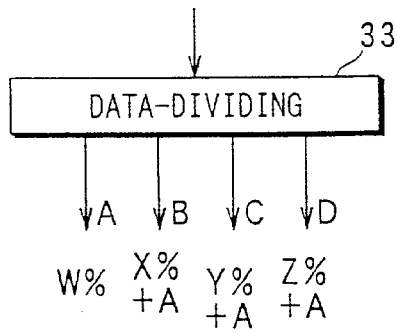

In the dividing methods of FIG. 14C and FIG. 14D, the same data as that transmitted to the micro-cell base station 10 is also transmitted to the spot-cell base stations 20 in the communication using the OFDM signal and SS signal. In the method of FIG. 14C, the same data is transmitted to three spot-cell base stations 20 as in FIG. 14A, but the data same as the data A transmitted to the micro-cell base station 10 is added to the respective data. In the method of FIG. 14D, different data are transmitted to three spot-cell base stations 20 as in FIG. 14B, but the data same as data A transmitted to the micro-cell base station 10 is added to respective data.

Figure 15A:
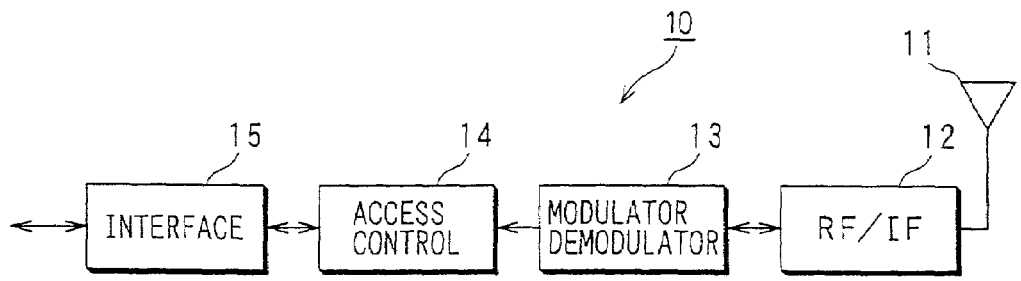
FIGS. 15A, 15B and 15C illustrate a radio equipment in the micro-cell base station, the spot-cell base station and the mobile terminal.
Figure 15B:
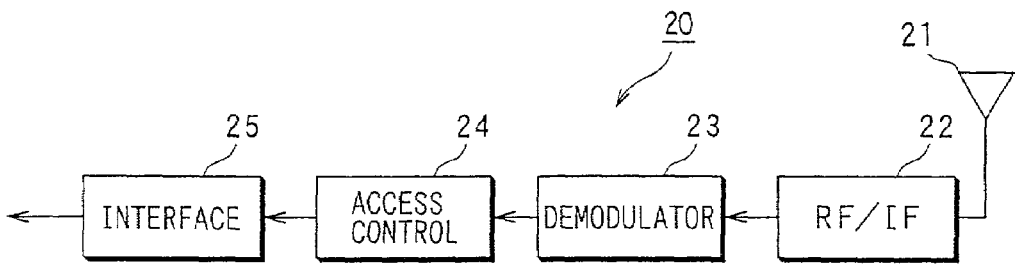
Figure 15C:
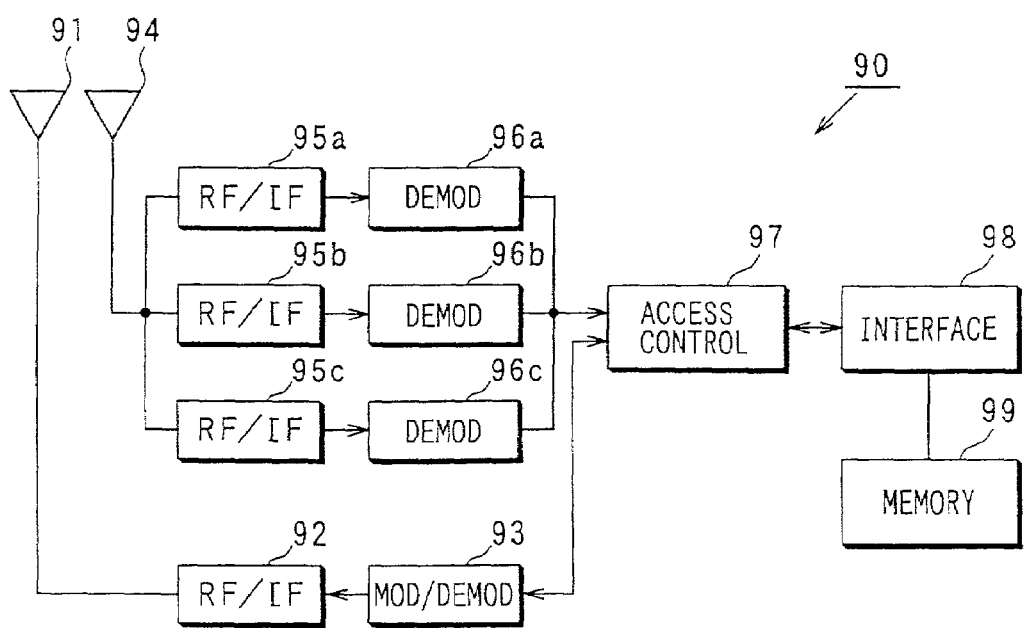

The micro-cell base station 10, spot-cell base station 20 and mobile terminal 90 has respective radio units illustrated in FIGS. 15A, 15B and 15C. As illustrated in FIG. 15A, the radio unit in the micro-cell base station 10 comprises an antenna 11, an RF/IF circuit 12, a modulator/demodulator 13, a radio access control unit 14 and a network interface 15. As illustrated in FIG. 15B, the radio unit of the spot-cell base station 20 comprises an antenna 21, an RF/IF circuit 22, a demodulator 23, a radio access control unit 24 and a network interface 25. As illustrated in FIG. 15C, the radio unit of the mobile terminal 90 comprises an antenna 91, an RF/IF circuit 92, a modulator/demodulator 93, an antenna 94, RF/IF circuits 95a, 95b, 95c, demodulators 96a, 96b, 96c, a radio access control unit 97, a network interface 98 and a memory 99. The RF frequencies of three spot-cell base stations 20 are different as illustrated in FIG. 6 to FIG. 9.

The signal transmitted from the micro-cell base station 10 is received with the antenna 91, down-converted to the IF signal in the RF/IF circuit 92 and demodulated with the modulator/demodulator 93. The demodulated data is stored in the memory 99 via the radio access control unit 97 and network interface 98. Moreover, the transmitting data is transferred to the modulator/demodulator 93 for the purpose of modulation, then up-converted to the RF signal in the RF/IF circuit 92 and transmitted from the antenna 91.

The signal transmitted from the spot-cell base station 20 is received with the antenna 94, down-converted in the RF/IF circuits 95a, 95b, 95c and demodulated respectively in the demodulators 96a, 96b, 96c. The data demodulated in any demodulator is stored in the memory 99 via the radio access control unit 97 and network interface 98. The radio access control unit 97 controls each unit to perform the receiving process and transmitting process.

Since the mobile terminal 90 is provided with the transmitting/receiving units (first communication means) 92, 93 for transmitting/receiving the signal to/from the micro-cell base station 10 and the receiving unit (second communication means) 95a, 95b, 95c, 96a, 96b, 96c for receiving the signal transmitted from the spot-cell base station 20, normal transmission and reception can be made in the micro-cell M and the normal reception can also be made in the spot-cell SP. As illustrated in FIG. 10, when the same RF signal is used in three spot-cell base stations 20, it is possible to form the RF/IF circuits 95a, 95b, 95c and demodulators 96a, 96b, 96c with only one unit.

(Second Embodiment)

Figure 16:
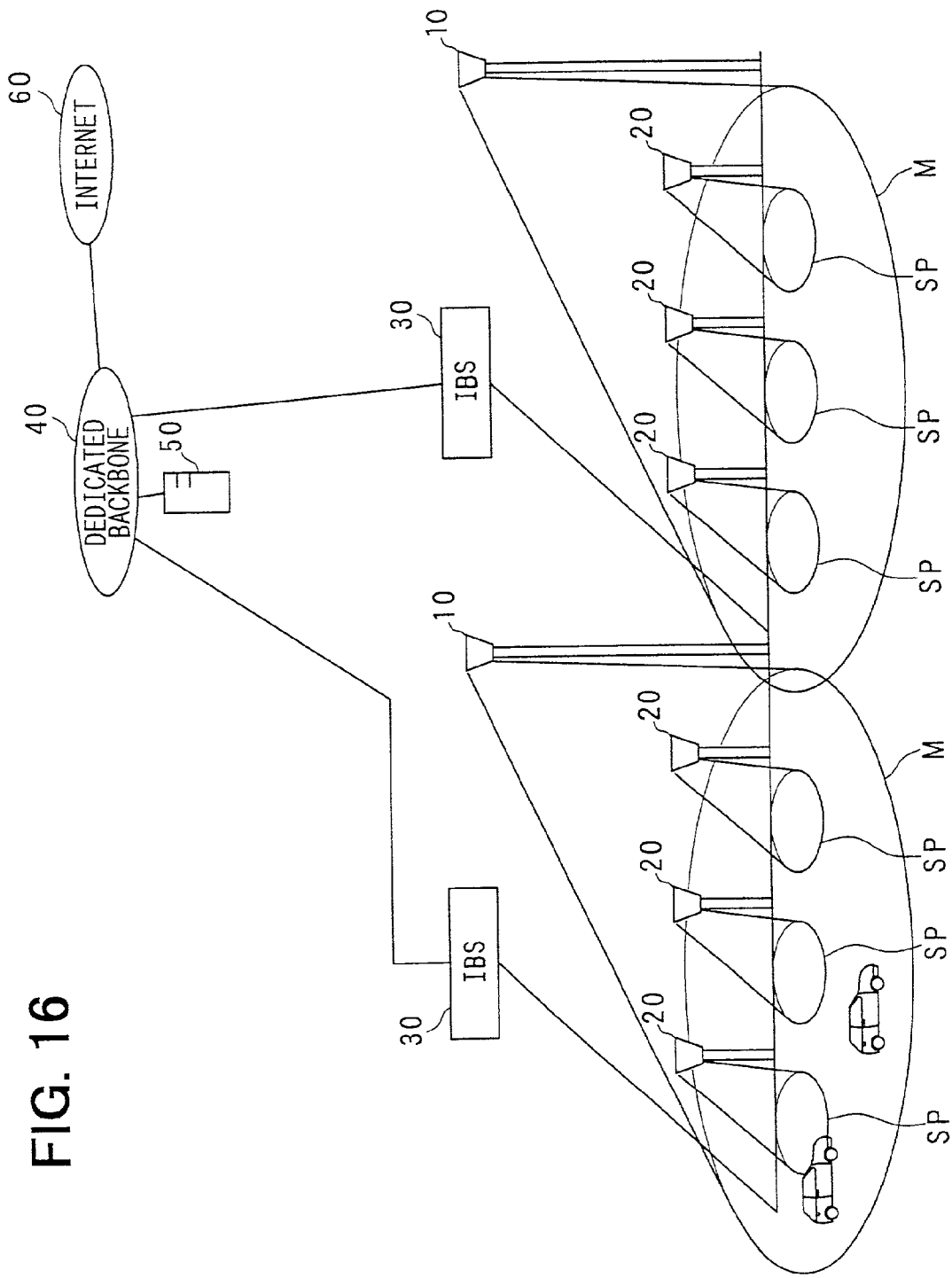
FIG. 16 illustrates a road-to-vehicle communication system according to a second embodiment of the present invention.

In this embodiment, the road-to-vehicle communication is executed by the use of opto-radio technology. Even in this embodiment, as illustrated in FIG. 16, the micro-cell base station 10 and a plurality of spot-cell base stations 20 are allocated in the respective large cells and a plurality of spot-cells SP are included within the micro-cell M. However, a microwave is used for communication in the micro-cell M, but a millimeter wave is used in the spot-cell SP. The reason is that high speed transmission utilizing sufficient bandwidth can be made from the spot-cell base station 20 because the millimeter wave has a bandwidth 100 times the microwave band. However, it is difficult to establish a communication link in a wide frequency band because the millimeter wave has a linear transmission property and also shows higher transmission loss in the air. Moreover the microwave does not have such a high linear transmission property and shows less transmission loss in the air. Thereby, the microwave can obtain a wide communication area.

This embodiment is explained mainly in a different part from the first embodiment.

Figure 17:
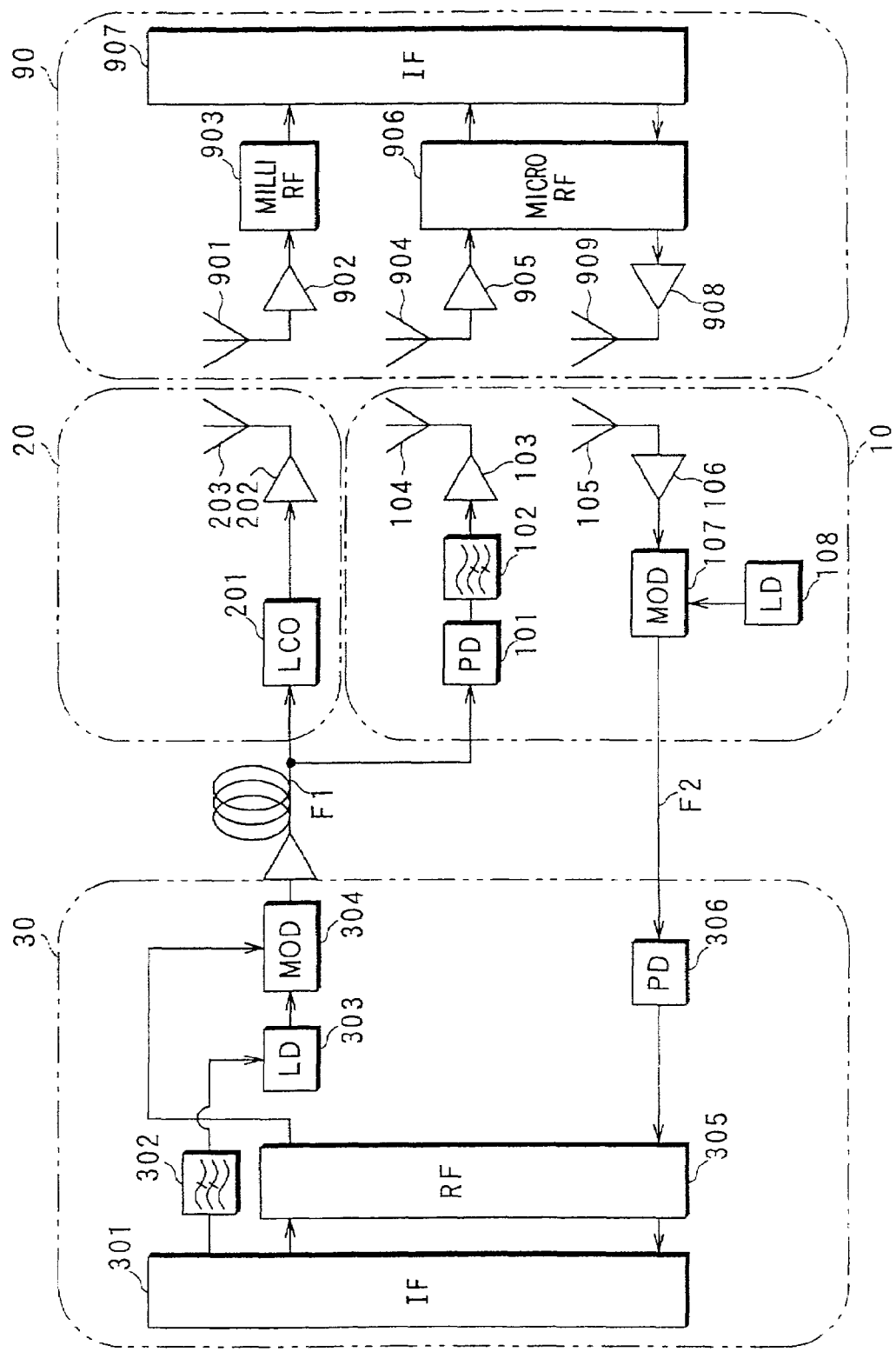
FIG. 17 illustrates an integrated base station, a micro-cell base station, a spot-cell base station and a mobile terminal in the second embodiment.

FIG. 17 illustrates the integrated base station 30, micro-cell base station 10, spot-cell base station 20 and the mobile terminal 90.

The integrated base station 30 comprises an interface 301, a low-pass filter 302, a laser diode (LD) 303, a modulator 304, an RF unit 305 and a photodiode 306.

The interface 301 generates, from the data transmitted from the server 50, a digital signal (baseband signal) processed to the format (error correcting encoding and forming of radio frame) required for transmission to the spot-cell base station 20 and a digital signal processed to the format (error correcting encoding and forming of radio frame) required for transmission to the micro-cell base station 10 via the dedicated backbone 40. The digital signal transmitted to the micro-cell base station 10 is converted to an analog signal in the RF unit 305, then up-converted and outputted as a high frequency signal (e.g., radio signal of 5 GHz band).

The digital signal outputted from the interface 301 is cut off in the high frequency element by the low-pass filter 302 and is limited to a bandwidth that does not interfere with the high frequency signal. The digital signal outputted from the low-pass filter 302 is inputted to the laser diode 303. In the laser diode 303, an intensity-modulated optical-intensity modulated signal is generated from the input digital signal. This optical-intensity modulated signal is modulated with the high frequency signal outputted from the RF unit 305 in the modulator 304. Therefore, the optical signal outputted from the modulator 304 is converted to the optical signal modulated with the signal for the spot-cell base station (the baseband signal of the first frequency band via the low-pass filter 302) and the signal for micro-cell base station (the high frequency signal of the second frequency band outputted from the RF unit 305).

The optical signal outputted from the modulator 304 is transmitted through an optical fiber F1 (an optical amplifier may be provided in the course of this optical fiber) forming an optical transmission line and is then distributed to the spot-cell base station 20 and the micro-cell base station 10 through an optical distributor. The optical signal is also distributed to another spot-cell base station 20 (not illustrated).

The spot-cell base station 20 comprises an optical control type millimeter wave signal oscillator 201 (LCO: Light Controlled Oscillator), an amplifier 202 and an antenna 203. The LCO 201 is an oscillator which oscillates in the radio frequency band. This oscillator can change the oscillation frequency depending on the irradiated optical-intensity. When the modulation frequency of the irradiated optical signal is in the bandwidth of the high frequency signal (up to several tens of GHz), the oscillation frequency does not change. When the modulation frequency is in the other baseband region (up to several hundreds MHz), the oscillation frequency changes depending on this modulation frequency. The LCO 201 is controlled with the optical signal transmitted from the integrated base station 30 and generates the frequency shift modulated (FSK) millimeter wave signal (e.g., the signal of 37 GHz band) by shifting the millimeter wave oscillation frequency responding to the mark and space of the baseband signal. This millimeter wave FSK signal is amplified with the amplifier 202 and is then radiated from the antenna 203.

The micro-cell base station 10 comprises a photodiode (PD) 101 forming a photoelectric converter, a high-pass filter 102, amplifiers 103, 106, antennas 104, 105, a modulator 107 and a laser diode (LD) 108. The optical signal transmitted from the integrated base station 30 is then inputted to the photodiode 101. The photodiode 101 converts all signals from the baseband signal to high frequency signal to the electrical signals and the high-pass filter 102 allows only the high frequency signal to pass. The high frequency signal outputted from the high-pass filter 102 is amplified by the amplifier 103 and is then radiated from the antenna 104.

The mobile terminal 90 mounted in a vehicle comprises antennas 901, 904, 909, amplifiers 902, 905, 908, a millimeter wave RF unit 903, a microwave RF unit 906 and an interface 907.

The millimeter wave FSK signal transmitted from the spot-cell base station 20 is received with the antenna 901, amplified by the amplifier 902 and is then inputted to the millimeter wave RF unit 903. The millimeter wave RF unit 903 executes asynchronous detection such as discrete detection or the like without use of the millimeter wave oscillator and then executes the demodulation process to output a digital demodulated signal.

The high frequency signal transmitted from the micro-cell base station 10 is received with the antenna 904, amplified by the amplifier 905 and is then inputted to the microwave RF unit 906. The microwave RF unit 906 executes the synchronous detection using a high frequency oscillator and also executes the demodulation process to output a digital demodulated signal. The high frequency oscillator is also used for up-link transmission.

The digital signals outputted from the millimeter wave RF unit 903 and microwave RF unit 906 are stored in the internal memory or the like via the interface 907.

Moreover, the signal transmitted from the mobile terminal 90 is sent to the microwave RF unit 906 from the interface 907. This signal is processed to the radio signal (e.g., 5 GHz band) by the microwave RF unit 906 through the error correction encoding, forming of radio frame, radio modulation and up-converting, amplified by the amplifier 908 and is then radiated from the antenna 909.

The signal transmitted from the mobile terminal 90 is then received with the antenna 105 by the micro-cell base station 10 and is then amplified by the amplifier 106. With this amplified signal, the intensity of light from the laser diode 108 is modulated with the modulator 107 and thereby the optical-intensity modulated signal is generated. This optical-intensity modulated signal is transmitted to the integrated base station 30 with the optical fiber (an optical amplifier may be provided in this optical fiber) F2. This transferred optical-intensity modulated signal is then converted to an electric signal by the photodiode 306 in the integrated base station 30 and is demodulated with the RF unit 305 and finally it is outputted as a digital demodulated signal. This digital demodulated signal is then transmitted to the server 30 via the interface 301.

According to this embodiment, the information transmission in the wide frequency band can be realized in bilateral communication using the microwave in the micro-cell M. The large-capacity information can momentarily be transmitted to the mobile terminal 90 just like a burst signal through the millimeter wave FSK communication when the mobile terminal 90 has entered the spot-cell SP. In this case, it is also possible that such a large-capacity information can be transmitted to the mobile terminal 90 to support the communication through the communication using the microwave when the mobile terminal 90 exists within the spot-cell SP.

Moreover, when the millimeter wave is used in the communication as in the case of this embodiment, it is normally required to provide a local oscillator (millimeter wave oscillator) and mixer in the spot-cell base station 20. According to this embodiment, however, the local oscillator and mixer may be eliminated by providing LCO 201 (oscillator for direct response to change of intensity of irradiated light) and the structure of spot-cell base station 20 can be simplified.

Figure 18:
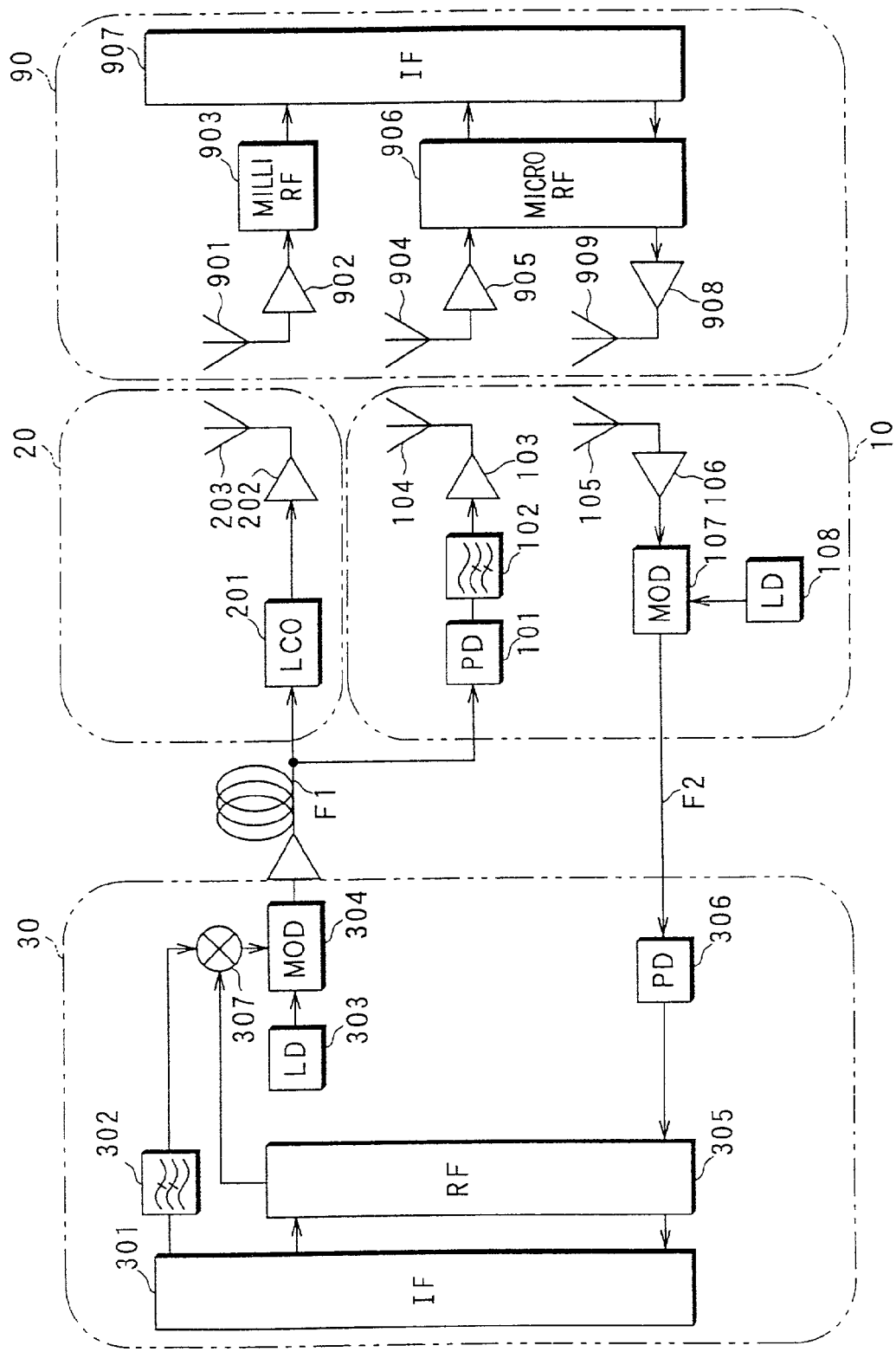
FIG. 18 illustrates a modification of the communication system illustrated in FIG. 17.
Figure 19:
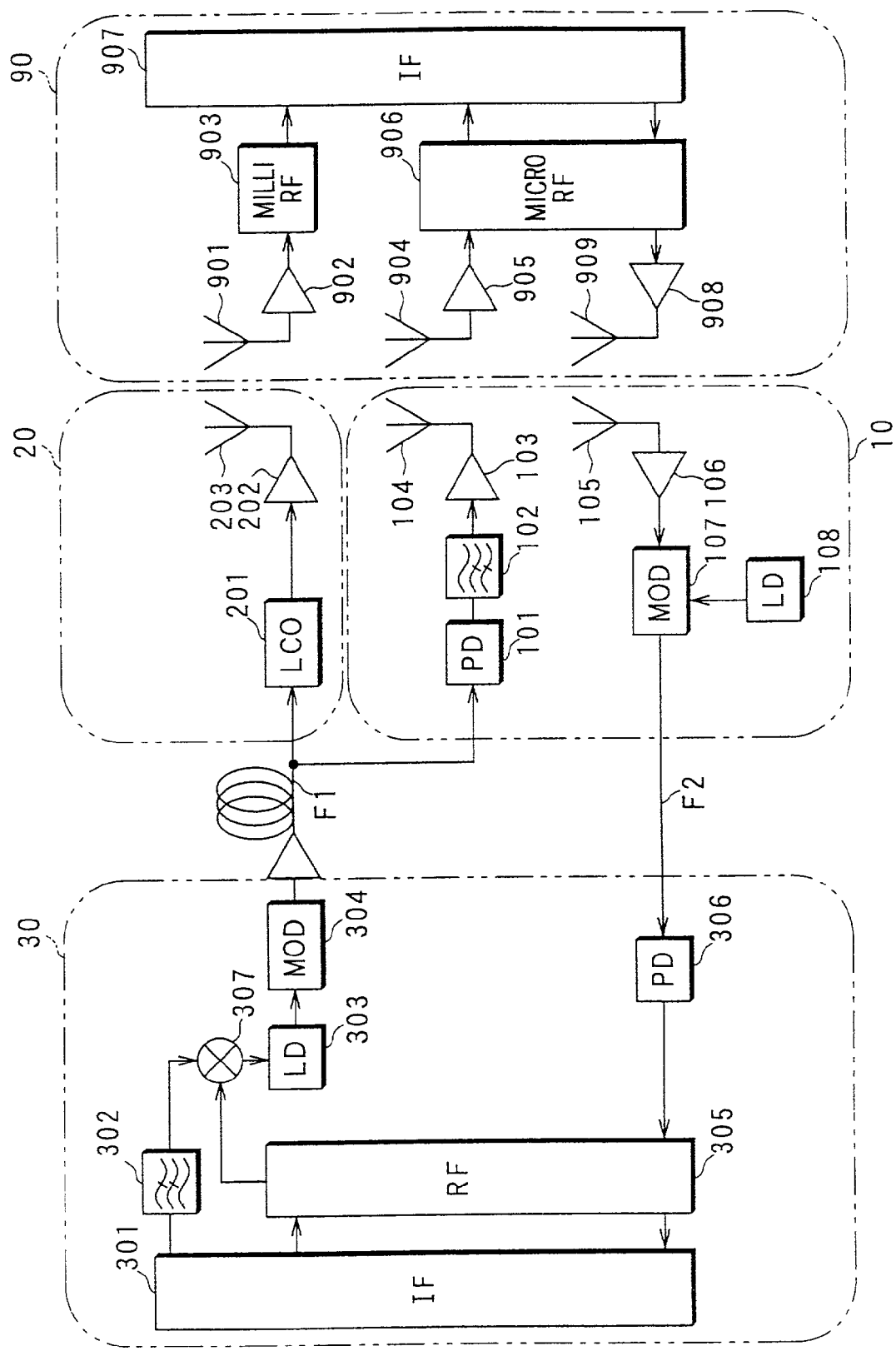
FIG. 19 illustrates another modification of the communication system illustrated in FIG. 17.

The integrated base station 30 may be modified as illustrated in FIG. 18 and FIG. 19. In the integrated base station illustrated in FIG. 18, the digital signal outputted from the low-pass filter 302 and the high frequency signal outputted from the RF unit 305 are mixed in a mixer 307. This mixed signal modulates the intensity of light from the laser diode 303 in the modulator 304. In the integrated base station 30 illustrated in FIG. 19, the digital signal outputted from the low-pass filter 302 and the high frequency signal outputted from the RF unit 305 are mixed in the mixer 307. This mixed signal modulates the intensity of light of the laser diode 303.

The present invention should not be limited to the disclosed embodiments and modifications, but may be implemented in many other ways without departing from the spirit of the invention.

What is claimed is:

1. A communication system for communication with a mobile terminal comprising:
   a wide cell base station for executing communication with the mobile terminal in a wide cell;
   a plurality of narrow cell base stations for executing communications with the mobile terminal in a plurality of narrow cells included in the wide cell; and
   an integrated base station for executing communications with the wide cell base station and the narrow cell base stations,
   wherein:
   the wide cell base station executes communication with the mobile terminal;
   the narrow cell base stations execute only one-way communications with the mobile terminal; and
   the narrow cell base stations transmit the same signals repeatedly to the respective narrow cells after the communication is established between the wide cell base station and the mobile terminal.

2. The communication system as in claim 1, further comprising:
   a network; and
   a server,
   wherein the integrated base station is provided in each wide cell and each integrated base station is connected to the server via the network.

3. The communication system as in claim 1, wherein:
   the wide cell base station and the narrow cell base stations respectively execute communication with the mobile terminal using an OFDM signal.

4. The communication system as in claim 3, wherein:
   the narrow cell base stations transmit signals which are the same as that in the wide cell base station.

5. The communication system as in claim 1, wherein:
   the wide cell base station and the narrow cell base stations respectively execute communication with the mobile terminal using a single carrier signal.

6. The communication system as in claim 1, wherein:
   the wide cell base station and the mobile terminal execute communication in different frequencies from that of communication executed between the narrow cell base stations and the mobile terminal.

7. The communication system as in claim 1, wherein:
   the integrated base station for controlling the narrow cell base stations is provided with a facility to control multiple accesses of the mobile terminal for central control of the multiple access.

8. The communication system as in claim 1, wherein the narrow cell base stations transmit the same signals to the respective narrow cells after the wide cell base station has received an information request to the narrow cells outputted from the mobile terminal.

9. The communication system as in claim 1, wherein:
   the wide cell base station and the narrow cell base stations are provided on a travel road for vehicles; and
   the mobile terminal is mounted on a vehicle.

10. A communication system for communication with a mobile terminal comprising:
    a wide cell base station for executing communication with the mobile terminal in a wide cell;

a plurality of narrow cell base stations for executing communications with the mobile terminal in a plurality of narrow cells included in the wide cell; and an integrated base station for executing communications with the wide cell base station and the narrow cell base stations, wherein:

the wide cell base station executes communication with the mobile terminal;

the narrow cell base stations execute only one-way communications with the mobile terminal; and the narrow cell base stations transmit the same signals to the respective narrow cells after the wide cell base station has received an information request to the narrow cells outputted from the mobile terminal.

11. The communication system as in claim 10, wherein:

the wide cell base station and the narrow cell base stations are provided on a travel road for vehicles; and the mobile terminal is mounted on a vehicle.

12. A communication system for communication with a mobile terminal comprising:

a wide cell base station for executing communication with the mobile terminal in a wide cell;

a plurality of narrow cell base stations for executing communications with the mobile terminal in a plurality of narrow cells included in the wide cell; and an integrated base station for executing communications with the wide cell base station and the narrow cell base stations, wherein:

the integrated base station through an optical transmission line; and the wide cell base station and the narrow cell base stations communicate with the mobile terminal through radio waves.

13. The communication system as in claim 12, wherein:

the integrated base station transmits an optical signal modulated with a signal for the wide cell base station and a signal for the narrow cell base stations; and the wide cell base station and the narrow cell base stations transmit signals to the mobile terminal based on the respective signal elements transmitted for the respective base stations in the transmitted optical signal.

14. The communication system as in claim 13, wherein:

the signal for the narrow cell base stations is in a first frequency band; and the signal for the wide cell base station is in a second frequency band which is different from the first frequency band.

15. The communication system as in claim 14, wherein the narrow cell base stations each has:

an oscillator which oscillates independently of the signal of the second frequency band but dependently on the signal of the first frequency band, and changes an oscillation frequency depending on intensity of irradiated light; and an antenna for transmitting a radio wave depending on an output of the oscillator as a transmitting signal and thereby the oscillator is irradiated with the optical signal supplied from the integrated base station via the optical transmission line.

16. The communication system as in claim 14, wherein the wide cell base station has:

a photo-electric converting means for converting the optical signal supplied from the integrated base station via the optical transmission line into an electric signal;

a filter means for cutting off the signal of the first frequency band among the converted electric signal and allows the signal of the second frequency band to pass; and an antenna for transmitting the radio wave depending on the transmitting signal as an output of the filter means.

17. The communication system as in claim 12, wherein:

communication is executed using a microwave signal between the wide cell base station and the mobile terminal; and communication is executed using a millimeter wave signal between the narrow cell base stations and the mobile terminal.

18. The communication system as in claim 12, wherein:

the wide cell base station and the narrow cell base stations are provided on a travel road for vehicles; and the mobile terminal is mounted on a vehicle.

19. A communication method comprising the steps of:

executing communication between a wide cell base station and a mobile terminal when the mobile terminal exists within a wide cell; and executing communication between narrow cell base stations and the mobile terminal when the mobile terminal exists within any one of a plurality narrow cells included in the wide cell, wherein:

the wide cell base station and the narrow cell base stations execute communication respectively with the mobile terminal based on communication with an integrated base station;

the wide cell base station executes communication with the mobile terminal on a two-way communication basis;

the narrow cell base stations execute only one-way communication with the mobile terminal; and the narrow cell base stations repeatedly transmit the same signals in respective narrow cells after communication is set up between the wide cell base station and the mobile terminal.

20. The communication method as in claim 19, wherein the narrow cell base stations respectively transmit the same signals in the narrow cells after the wide cell base station has received an information request in the narrow cells outputted from the mobile terminal.

21. The communication method as in claim 19, wherein:

the wide cell base station and the narrow cell base stations are provided on a travel road for vehicles; and the mobile terminal is mounted on a vehicle.

22. A communication method comprising the steps of:

executing communication between a wide cell base station and a mobile terminal when the mobile terminal exists within a wide cell; and executing communication between narrow cell base stations and the mobile terminal when the mobile terminal exists within any one of a plurality narrow cells included in the wide cell, wherein:

the wide cell base station and the narrow cell base stations execute communication respectively with the mobile terminal based on communication with an integrated base station;

the wide cell base station executes communication with the mobile terminal on a two-way communication basis;

the narrow cell base stations execute only one-way communication with the mobile terminal; and the narrow cell base stations respectively transmit the same signals in the narrow cells after the wide cell base station has received an information request in the narrow cells outputted from the mobile terminal.

23. The communication method as in claim 22, wherein:
the wide cell base station and the narrow cell base stations are provided on a travel road for vehicles; and
the mobile terminal is mounted on a vehicle.

24. A mobile terminal for a communication system having a wide cell base station for executing communication in a wide cell, a plurality of narrow cell base stations for executing communication in a plurality of narrow cells included in the wide cell and an integrated base station for executing communication with the wide cell base station and the narrow cell base stations, the mobile terminal comprising:

a first communication means for executing communication with the wide cell base station provided in the wide cell; and a second communication means for executing communication with the narrow cell base stations provided in the narrow cells respectively.

25. The mobile terminal as in claim 24, wherein:

the first communication means transmits a signal to the wide cell base station and receives a signal transmitted from the wide cell base station; and the second communication means only receives a signal transmitted from the narrow cell base station.

* * * * *